Patented Dec. 11, 1923.

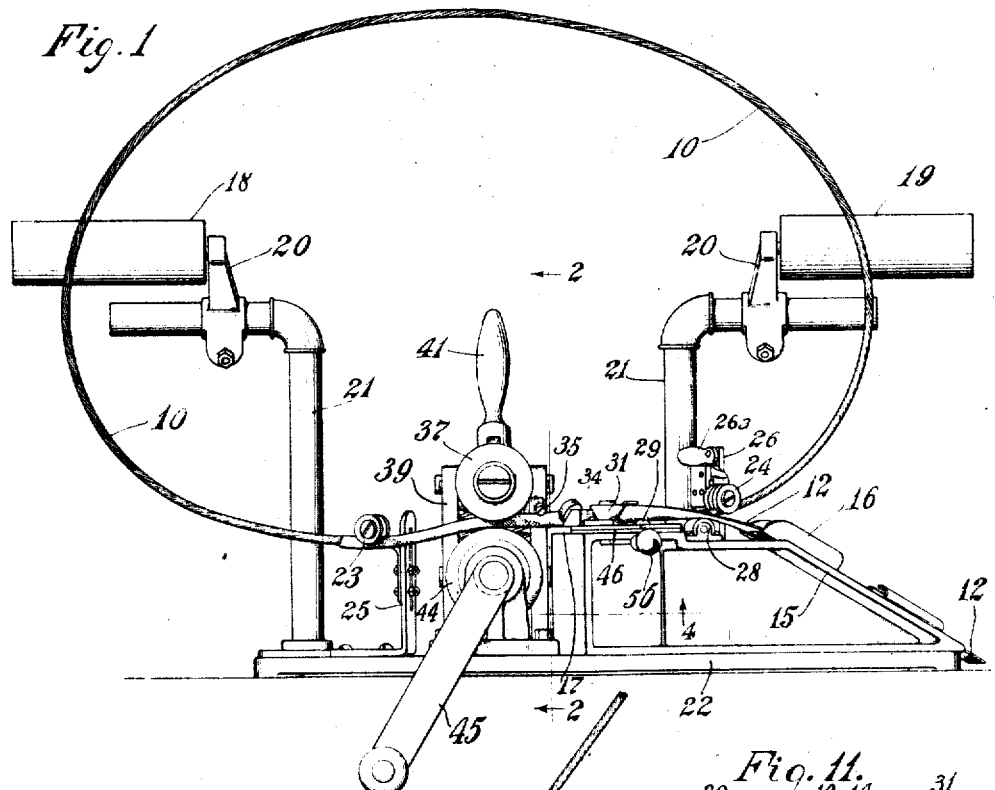
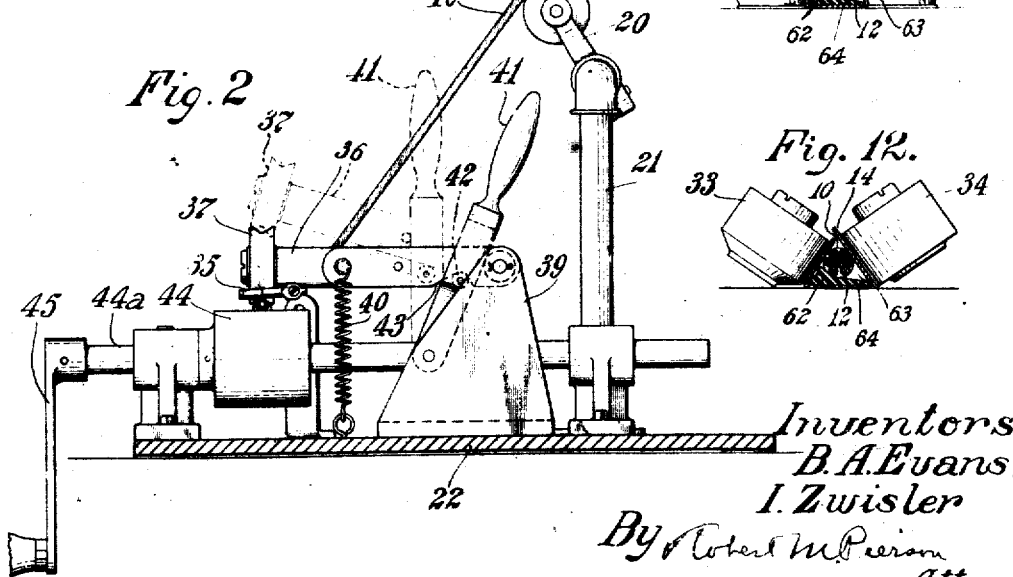

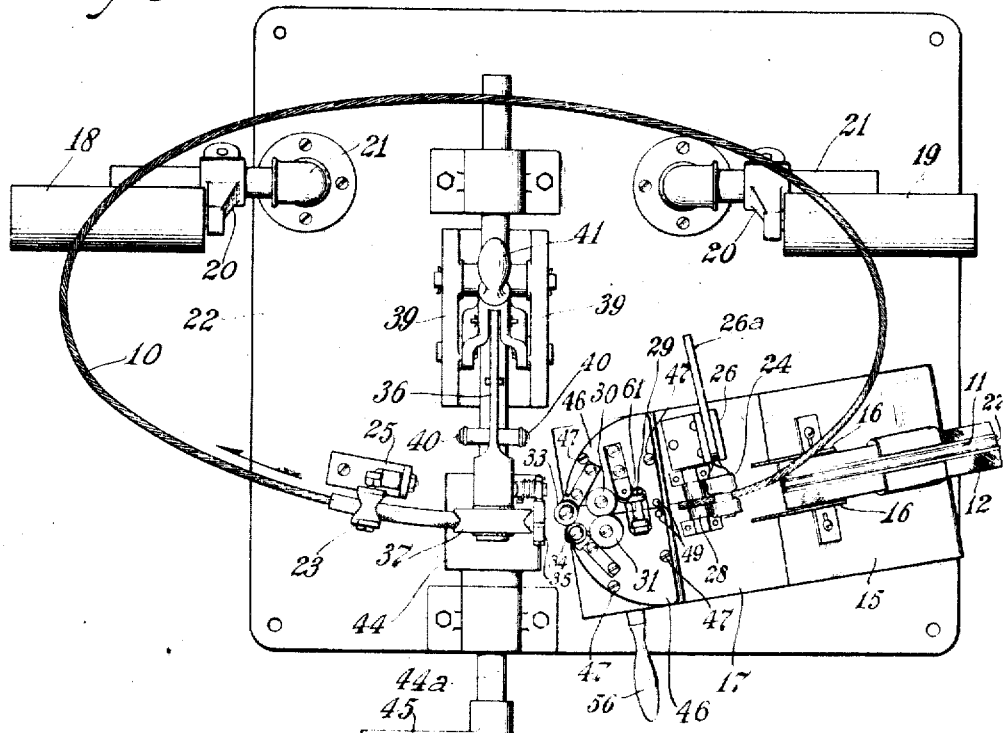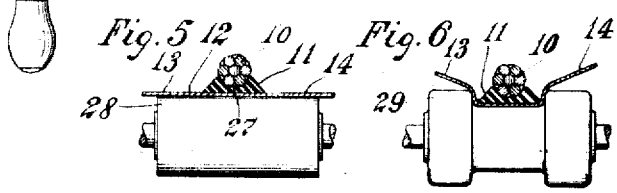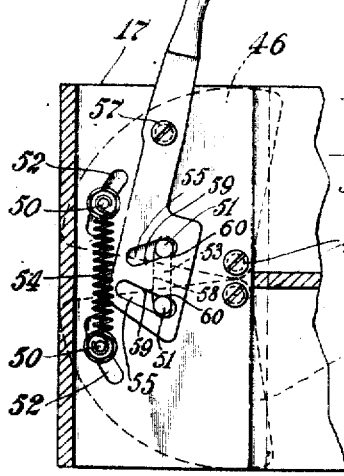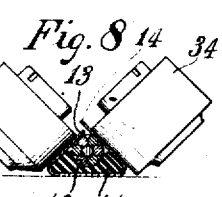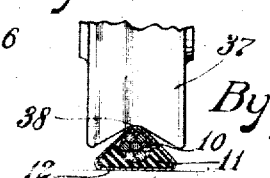

1,476,807

UNITED STATES PATENT OFFICE.

BENJAMIN A. EVANS AND IRVIN ZWISLER, OF AKRON, OHIO, ASSIGNORS TO THE B. F. GOODRICH COMPANY, OF NEW YORK, N. Y., A CORPORATION OF NEW YORK.

METHOD AND APPARATUS FOR COVERING RINGS.

Application filed January 23, 1920. Serial No. 353,521.

*To all whom it may concern:*

Be it known that we, BENJAMIN A. EVANS and IRVIN ZWISLER, citizens of the United States, residing at Akron, in the county of Summit and State of Ohio, have invented a certain new and useful Method and Apparatus for Covering Rings, of which the following is a specification.

This invention relates to a method and apparatus for applying a covering, such as a strip of fabric, or a plastic substance such as vulcanizable rubber in strip form, or both, to a ring, and more particularly to a flexible wire ring, our invention being especially directed to the production of inextensible bead-cores for pneumatic tire casings, and our object being to save time and secure a better product as compared with prior modes of performing this work.

Of the accompanying drawings:

Fig. 1 is a front elevation showing an apparatus embodying and adapted to carry out our invention, the work being shown in process of being operated on.

Fig. 2 is a transverse sectional view thereof taken on the line 2—2 of Fig. 1.

Fig. 3 is a plan view thereof with a part of the ring and covering strip broken away to show the cover-folding and forming tools.

Fig. 4 is a reverse plan view of a portion of the table, showing means for operating the tool-carrying plates.

Figs. 5 to 10 inclusive are transverse sectional views illustrating the several steps in the method of combining the filler and fabric cover with a cable ring to make a bead core in accordance with our invention.

Figs. 11 and 12 are views corresponding to Figs. 7 and 8 showing the use of a modified form of filler.

In the drawings, 10 is an endless, twisted or cabled, wire, flexible ring adapted to form the inextensible element of a bead core, and 11 is a grooved strip of vulcanizable rubber compound or other suitable plastic filler, which is brought to the machine superimposed upon a strip 12 of bias-cut rubberized fabric whose width is sufficient to enclose the wire ring and filler when folded thereover, said filler being preferably placed slightly nearer one edge of the strip than the other, as shown, so as to leave a relatively-narrow margin 13 and a wider margin 14.

15 is an upwardly-inclined guide base on which are mounted suitable strip guides including a pair of side plates 16 which are laterally adjustable to accommodate cover-strips of different widths. 17 is a substantially-flat horizontal table or base on which the strip-folding tools or rollers are mounted. The lower part of the ring 10 is supported by this table or by the laminated strip, and its upper part is supported by two rollers 18, 19 carried by brackets 20 adjustably mounted on standards 21, located in the rear of the table 17, these upper guide rollers being so positioned that the ring is inclined backwardly from the operator in a plane between the vertical and the horizontal. 22 is the bed-plate supporting the table and standards.

In order to facilitate the application of the covering materials to the wire cable ring, and also in order to utilize the resiliency of said ring in embedding the ring firmly in the groove 27 of the filler strip 11, the lower portion of the ring is straightened or has its curvature reduced by means of spaced rollers 23, 24 which cooperate with the table in flattening the normal arc of said ring. These rollers are mounted on supporting brackets 25, 26, and the bracket for the roller 23 is vertically adjustable so that the course of the work on leaving the covering devices may be slightly varied. The roller 24 is pivotally mounted on the bracket 26 and is normally held in operative position by a cam lever 26ª.

A cylindrical roller 28 mounted on the table at the summit of the inclined guide base 15 guides the strip into contact with the ring and provides a firm base on which the ring is pressed into the filler. The first of the cover-folding tools consists of a cylindrical-waisted grooved roller 29 which turns up the margins of the fabric strip 12 while leaving its midddle portion flat. The next folding instrumentality consists of a pair of substantially frusto-conical rollers 30, 31 mounted on vertical axes with their smaller ends downward, said smaller ends being slightly flanged and adapted to be driven by contact with the lower angles or corners of the partly-turned fabric strip which are backed by the plastic filler, while their flared upper portions initiate the folding inward of the loose margins of the fabric strip and rotate at a greater peripheral speed than the speed of the fabric so as to exert a forward-wiping action on its margins. The third folding instrumentality comprises a pair of cylindrical rollers 33, 34 having their axes inclined upwardly toward each other, and mounted one slightly in advance of the other, which then press the margins of the cover against the cable. The fourth folding tool is a horizontal cylindrical roller 35 carried by a downwardly spring-pressed pivoted arm 36 for compressing the seam formed by the edges of the fabric which have been brought into partly lapped relation by the rollers 33, 34, and the fifth tool is a horizontal grooved roller 37 which rolls down the free, overlapping edge 38 to perfect the seam. All of these rollers are journaled to rotate freely.

Roller 37 is carried by the arm 36 which is pivotally mounted on a support 39 and is normally held in its operative position by a pair of springs 40, but said arm and roller may, when the work is to be inserted and removed, be shifted to an inoperative position as indicated by the broken lines in Fig. 2, by means of a lever 41 pivotally mounted on the support 39 and having a roller 42 which contacts with a cam surface 43 on the lower side of the arm. One function of the roller 37 is to act as a feed roller for the work in conjunction with a lower positively-driven cylindrical roller 44 against which the grooved roller yieldingly presses the covered ring, said roller 44 being attached to a shaft 44ᵃ on the outer end of which is a hand crank 45 for turning the shaft and roller.

The journal-studs of the respective oppositely-disposed rollers 30, 31 and 33, 34 are mounted on a pair of plates 46 which are pivoted at 49 on the upper side of the table. Each plate 46 is made in two parts as indicated in Fig. 1, the upper part which carries the rollers being detachably secured by screws 47 (Fig. 3) to the lower part which carries the studs hereinafter mentioned, so that a different set of rollers 30, 31, 33, 34 may be readily substituted when desired. Studs 50 and 51 carried by the lower members of the plates 46 project downwardly through slots 52 and 53 in the table, and the studs 50 are connected by a coiled spring 54. The studs 51 also project through a pair of cam slots 55 in a lever 56 which is pivotally mounted at 57 on the under side of the table, said studs 51 and the plates 46 and rollers 30, 31, 33, 34 carried thereby being spread apart by a clockwise rotation of the lever 56 as viewed from below in Fig. 4. Recesses 60 in the walls 59 of the slots 55 occupied by the studs 51 when they reach the outer ends of said slots, serve automatically to hold the plates 46 and their rollers in this inoperative position when it is desired to insert or remove the work.

A small roller 61 (Fig. 3) is shown on one of the plates 46 beyond the grooved roller 29, and is found to assist in turning the inner margin 13 of heavy strips as they pass from said roller 29 to the wiping roller 30 which is to turn under said margin to form the lower ply of the seam.

In making some oversize tires a finished bead core having an obtuse angle over the wire ring 10 (which angle will be at the heel of the bead in the tire) will fit more readily between the plies of the fabric used in the tire carcass and leave a minimum air space about the core. The rolls 33, 34 in that case may be set to press the filler 11 to the desired shape on the wire ring, but it has been found preferable to use a filling strip 62, as shown in Figs. 11 and 12, substantially triangular in cross-section, and to turn the margin 14 over onto the wire ring in such manner as to leave an air pocket 63 between the thin edge 64 of the filler, the cover margin 14 and the wire ring. This form of bead may be rolled to final shape and the air pocket removed by a bead-shaping apparatus such as is shown in Butler's Patent No. 1,318,643 of October 14, 1919. We prefer also to finish bead cores such as shown in Fig. 10 on a machine of that type when it is considered necessary to have the filler rolled to a sharp edge.

When operating the machine on the lighter bead-cores used in small tires, the wire-ring bending roller 24 is left in its operative position and a wire ring is placed under the roller 23 and bent down along the table until it can be caught under the roller 24. If a wire ring is too stiff to be bent onto the table in this manner the roller 24 is first raised by releasing the cam lever 26 and swinging the roller upwardly, the ring is placed on the table under the rollers 23 and 24 and the latter is then moved to its operative position and the cam 26ᵃ lowered to hold it down. A rubberized covering strip 12 carrying a filler strip 11 as described is placed between the guides on the inclined base 15, and the margins of the fabric at its leading end are lapped by hand over the inside of the wire ring. The crank 45 is then turned to move the ring circumferentially, feed the covering strip longitudinally onto the ring and draw the straightened portion of the ring (embedded in the plastic filler) between the fabric-folding and filler-shaping rollers. The grooved roller 29 gives the fabric strip a trough shape to initiate the folding thereof, and the conical rollers 30, 31 turn over the cover margins and exert a forward-wiping action thereon in the manner already described, their flared upper portions, which are traveling somewhat faster than the fabric strip, frictionally engaging the tacky surfaces of the strip and folding its margins over without wrinkling the fabric or doubling up the thin edges of the filler strip. The cylindrical rollers 33, 34 press the margins of the strip against the wire ring and exert a progressive squeezing action on two sides of the filler, thus rolling the whole into triangular shape. The rollers 35 and 37 respectively lap the edge of the strip and roll down the seam, thus completing the enclosure of the cable in a tubular covering. After a ring is covered, the levers 41 and 56 are operated to move the tools controlled by them to their inoperative positions while the covered ring is being replaced by an uncovered one, whereupon the tools are again moved to their ring-engaging positions.

The flattening or straightening of the portion of the ring where the covering strip is applied not only causes the ring to bear heavily upon the driving roller 44, due to the ring's resilience, and thereby compress the filler and afford a good driving contact without such pressure from the opposite roller 37 at the sharp heel of the bead as might unduly deform the work, but such straightening also eliminates for the moment the difference in its inner and outer peripheral lengths, so that it will receive the longitudinal covering strip snugly about it and permit it to be rolled without wrinkling or buckling such as would be likely to occur at the inner periphery in the application of such a cover to a curved sector of the ring, due to the relatively short longitudinal dimension of the inner periphery as compared with the outer. Such straightening also permits the application of the covering strip at one side of the crown of the ring, placing the greater part of the filler at the flat side opposite the heel of the bead, without requiring the covering strip to be bent in a plane oblique to its own plane, as would be necessary if the ring were not straightened, such a bending operation being difficult to perform without producing irregularities in the work. The covering strip being applied first to the broadest side of the bead, the greater part of the filler is fed directly to its final position in the bead, and the folding and pressing operations on the two narrower sides are substantially alike, so that direct, normal, balanced, compacting pressure is applied to all sides of the work, and the widths of the margins requiring to be folded is reduced to a minimum.

The bead-covering material being rolled approximately into its final cross-sectional form while the underlying part of the ring is straightened, said covering material, when the ring is subsequently allowed to spring back to its curved form, is compressed uniformly along its inner periphery and by such uniformity of compression, together with its cohesion and its adhesion to the ring, irregularity in the form of the bead is avoided.

It will be understood that many variations in the above-described mechanism could be made without departing from our invention.

We claim:

1. The method of covering a resiliently flexible ring which comprises straightening a portion of the ring, applying a covering to the portion of the ring which is straightened, rolling said covering to shape it about said ring while the underlying part of the ring is so straightened, and thereafter permitting said straightened part of the ring, by its resilience, to resume its normal curvature.

2. The method of covering a resiliently flexible ring which comprises reducing the curvature of successive portions of said ring, progressively applying a covering strip longitudinally to the straightened portion of the ring, laterally folding and compacting said covering strip about said straightened portion, and thereafter permitting said portion, by its resilience, to resume its normal curvature.

3. The method of covering a flexible ring which comprises circumferentially propelling said ring, reducing the curvature of successive portions thereof, progressively applying to such portions a plastic filler, progressively applying thereto a covering strip, and rolling said covering strip to shape it about said portions while they are so straightened.

4. The method of covering a flexible ring which comprises circumferentially propelling said ring, reducing the curvature of successive portions thereof, progressively applying to such portions, longitudinally thereof, a covering strip, and progressively folding said strip about said ring to enclose the same.

5. The method of covering a flexible ring which comprises circumferentially propelling said ring, reducing the curvature of successive portions thereof, feeding circumferentially upon said ring at the place where its curvature is reduced a composite strip comprising a covering strip overlaid with a narrower plastic strip, and progressively folding together the margins of said covering strip to enclose said ring and plastic strip.

6. The method of covering a flexible ring which comprises circumferentially propelling said ring in a plane inclined from the horizontal, progressively straightening the lower portion of said ring, and progressively feeding upon said portion, longitudinally, on the under side thereof, a strip of covering material.

7. The method of covering a flexible ring which comprises circumferentially propelling said ring, progressively straightening the lower portion thereof, progressively feeding upon the under side of the straightened portion, longitudinally thereof, a strip of plastic material and a strip of covering material, and progressively folding the margins of said strip of covering material around the plastic material and over the ring on the upper side of said straightened portion.

8. The method of covering a flexible ring which comprises circumferentially propelling said ring in a plane inclined from the horizontal, progressively straightening successive portions of said ring at the lower side thereof, progressively feeding to the straightened portion, longitudinally beneath the same, a flat strip of covering fabric on which is superposed a strip of plastic material, giving trough shape to said fabric strip, and progressively folding its margins over upon said ring and lapping them on the upper side of its said straightened portion.

9. The method of making bead-cores for tires which comprises circumferentially propelling a flexible reinforcing ring, progressively straightening said ring in a portion of its circumference, progressively feeding to said straightened portion, on its outer side, a fabric cover strip on which is superposed a narrower plastic filler strip, and progressively rolling said cover strip into triangular tubular form about said plastic strip and ring and lapping its edges on the inner side of said ring.

10. The method of covering a flexible ring which comprises moving the ring while reducing the curvature of a portion thereof, progressively feeding a covering strip onto the ring, and progressively folding the strip about said portion by a forward-wiping action exerted on the margins of the strip.

11. The method of covering a ring which comprises circumferentially propelling said ring, progressively straightening a portion thereof, progressively feeding a plastic material and a covering strip onto said portion, giving the said strip a trough shape, and folding the covering strip over the plastic filler and ring by a forward-wiping action exerted on the margins of said strip.

12. The method of combining an annular, flexible, metal element with a plastic element which comprises progressively bending a part of the flexible element to place the bent portion under a tension, feeding a plastic element onto the flexible element, and holding the plastic element on the flexible element against the tension produced in the bent portion thereof.

13. In apparatus for covering a resiliently flexible ring, the combination of means for circumferentially driving said ring, means for guiding a portion thereof along a straightened path, means for applying a covering to that portion of the ring which is traversing said path, and means for pressing said covering to shape it about said portion while the latter traverses said path.

14. In an apparatus of the class described, the combination of means for supporting a flexible ring and for straightening a portion thereof, means for circumferentially moving the ring, and means for folding a longitudinal covering strip transversely about the straightened portion.

15. In a ring-covering apparatus, the combination of means for supporting a flexible ring in a plane inclined from the horizontal, means for circumferentially propelling said ring, means for reducing the curvature of the lower portion thereof, and means for progressively folding upon said lower portion a longitudinally-fed strip of covering material.

16. In a ring-covering apparatus, the combination of means for supporting a flexible ring in a plane inclined from the horizontal, means for reducing the curvature of the lower portion thereof, means for circumferentially moving the ring, means for guiding a covering strip longitudinally onto the lower side of said portion, and means for folding the strip about the inner side of the ring.

17. In a ring-covering apparatus, the combination of means for circumferentially moving a flexible ring, means for progressively straightening a portion thereof, means for longitudinally guiding to said portion a strip of covering material, and a series of rollers for progressively folding the margins of said strip about the ring.

18. In a ring-covering apparatus, the combination of means for circumferentially moving a flexible ring, means for straightening successive portions thereof, means for guiding longitudinally onto the straightened portion a strip of covering material, a grooved roller for imparting to the strip a trough shape which initiates the folding of its margins about the ring, means for completing the folding of its margins about the ring, means for lapping the edges of the strip, and means for rolling the seam.

19. In apparatus for covering a resiliently flexible ring to form a tire-bead of triangular cross-section, the combination of feeding rollers embracing a portion of the circumference of the ring to propel the latter through a straightened path and to press a covering strip thereon, means for guiding a covering strip longitudinally onto the portion of said ring in said path, on the side thereof corresponding to the side opposite the heel of the finished bead, and means including a series of rollers for progressively folding the edges of the strip about said ring and joining them in a lapped seam at the heel of the bead.

20. In apparatus for covering a ring to form a tire-bead of triangular cross-section, the combination of means for rotatably supporting said ring, a pair of rollers, on axes oblique to said ring, adapted to embrace a section of said ring to propel the latter circumferentially, means for driving one of said rollers, means for guiding a filler strip and a covering strip longitudinally onto the side of said ring which is adjacent one of said rollers and represents the broadest side of the finished bead, opposite the heel, and means for folding said covering strip laterally about said ring and filler strip and joining its edges in a lapped seam, one of said rollers having a cylindrical working surface adapted to shape said side of the bead opposite the heel and the other of said rollers having a grooved working surface adapted to embrace the heel corner of the bead.

21. In a ring-covering apparatus, the combination of means for circumferentially propelling a flexible ring, means for guiding a portion of said ring in a straightened path, means for guiding a strip of covering material longitudinally onto the straightened portion, and means including devices for exerting a forward-wiping action upon the margins of said strip for folding said margins progressively about the ring.

22. In a ring-covering machine, the combination of means for circumferentially propelling a flexible ring, means for guiding a portion thereof in a straightened path, and means for guiding a strip of covering material longitudinally onto said ring and folding its margins about the latter, the last-said means including a grooved roller for imparting a trough shape to the strip, rollers for folding the sides of the strip over to an apex and causing them to assume a lapped relation, and roller means for pressing down the lapped edges to form a seam.

23. In a ring-covering apparatus, the combination of means for straightening a portion of a flexible ring, means for guiding a strip of covering material longitudinally onto the straightened portion, means for folding said strip triangularly about said portion and causing its edges to assume a lapped relation, means for initially rolling down said edges to form a seam, and a pair of ring and strip feeding rollers including a grooved roller for completing the rolling-down of said seam.

24. In a ring-rolling apparatus, the combination of means for supporting a flexible ring in a plane inclined between the vertical and horizontal, means for guiding the lower portion of said ring in a straightened path, a lower and an upper feed roller engaging said portion, the lower roller being substantially cylindrical and the upper one grooved, means for guiding longitudinally upon the straightened portion of said ring a strip of covering material, and means for folding the margins of said strip triangularly about the ring and lapping them on the inner side thereof before reaching said rollers.

25. In a ring-rolling apparatus, the combination of means for supporting a flexible ring in a plane inclined between the vertical and the horizontal, means for guiding the lower portion of said ring in a straightened path, means for guiding longitudinally onto the lower side of said portion a strip of covering material, a grooved roller for turning up the margins of said strip, leaving the middle flat, a pair of frusto-conical rollers for exerting a forward-wiping action on said margins, a pair of inclined rollers for pressing over said margins to an apex on the upper side of said lower portion of the ring, a substantially cylindrical roller for pressing down the seam formed by the edges of the strip, an upper grooved roller for further pressing down said seam, and an under, driven, feed roller opposite said upper grooved roller.

26. In a ring-covering apparatus, the combination of a base over which the ring is moved, means acting on the inner side of the ring adjacent said base to straighten the ring, a plurality of tool-supporting means pivotally mounted on the base, tools carried thereby and adapted to operate on a covering strip to form the latter about the straightened portion of the ring, and means for simultaneously moving said supports to separate the tools from the work.

27. In a ring-covering apparatus, the combination of means for straightening a portion of a flexible ring to permit the operation of tools thereagainst, a friction heel for driving the ring, a releasable spring-pressed wheel for engaging said ring and pressing it into frictional engagement with the driving wheel, said spring-pressed wheel having an inoperative position when released permitting the insertion of the ring, and folding means for incorporating a strip of covering material with said ring.

28. In apparatus for making annular tire-beads, the combination of means for circumferentially propelling an annular tire-bead structure, means for progressively straightening successive portions of said structure as it is so propelled, and a set of presser rollers adapted to run upon the straightened portion of said structure.

In testimony whereof we have hereunto set our hands this 20th day of January, 1920.

BENJAMIN A. EVANS.
IRVIN ZWISLER.